(No Model.)
R. C. FLOWERS.
ANIMAL TRAP.
No. 562,815. Patented June 30, 1896.
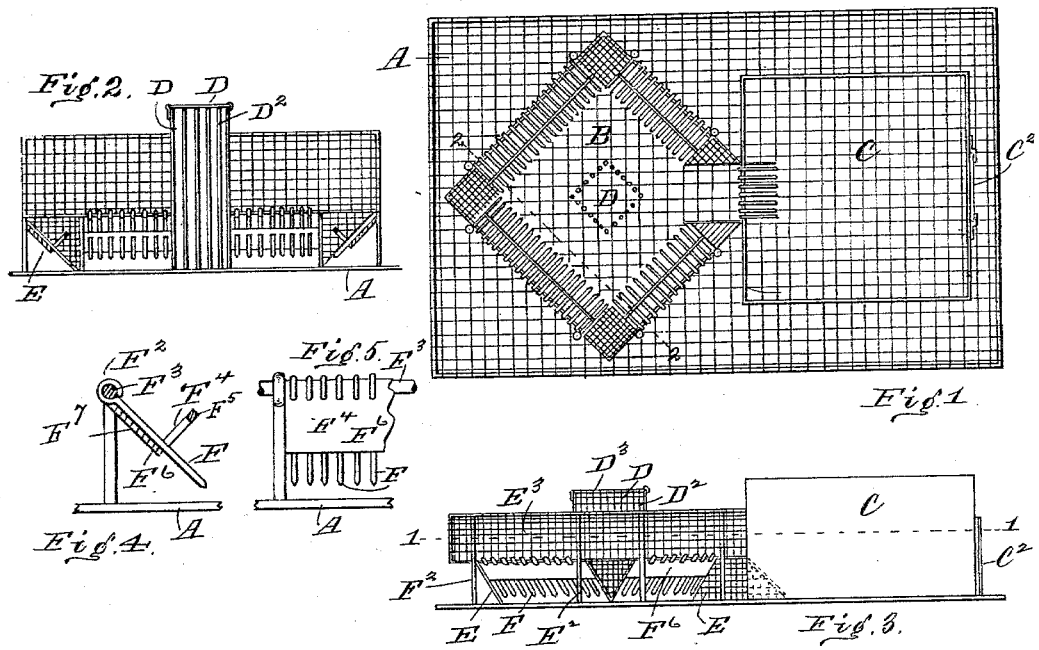
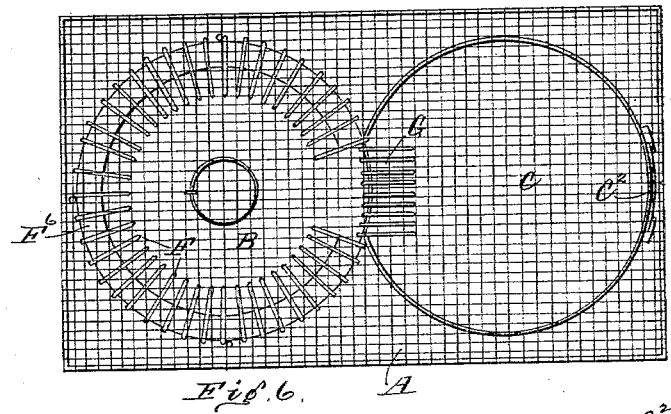
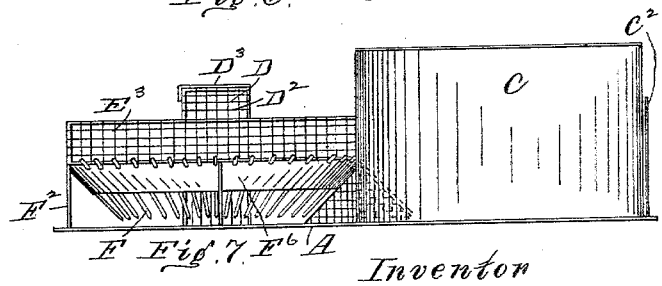
Witnesses
E. A. Edson
K. Smith
Inventor
Richard C. Flowers

UNITED STATES PATENT OFFICE.

RICHARD C. FLOWERS, OF CLEVES, OHIO.

ANIMAL-TRAP.

SPECIFICATION forming part of Letters Patent No. 562,815, dated June 30, 1896.

Application filed January 26, 1895. Serial No. 536,329. (No model.)

*To all whom it may concern:*

Be it known that I, RICHARD C. FLOWERS, a citizen of the United States, and a resident of Cleves, in the county of Hamilton and State of Ohio, have invented certain new and useful Improvements in Rat-Traps, of which the following is a specification.

The several features of my invention and the various advantages resulting from their use, conjointly or otherwise, will be apparent from the following description and claims.

In the accompanying drawings, making a part of this application, and in which similar letters of reference indicate corresponding parts, Figure 1 is a plan view of a trap embodying my invention. Fig. 2 is a vertical cross-section in the plane of the dotted line 2 2 of Fig. 1. Fig. 3 is a side elevation of the trap. Fig. 4 is a side elevation of a detail illustrating the construction of the lifting bars, fingers, or prongs. Fig. 5 is an end view of the same. Fig. 6 is a view of a trap constructed upon the same principle, but having its vestibule or first apartment rounded instead of quadrangular. Fig. 7 is a side elevation of the trap as shown in Fig. 6.

A indicates the floor of the trap, made of any suitable material, but preferably of wire, as here shown.

B indicates the vestibule or first chamber, which may be of any suitable form. It is preferably quadrangular in shape, or of a circular form, as shown in Figs. 6 and 7. In connection with this chamber B, I preferably employ a chamber C, as is the custom to do in rat-traps, this second chamber or apartment C receiving the surplus rats from the chamber B and keeping them therein and out of sight. The side walls of this chamber C are preferably made of a solid material, excepting the top, which is preferably covered with a wire-mesh.

The apartment C is provided with an outlet-door $C^2$, from which the rats may be taken after being drawn into the trap or when they are to be removed therefrom alive, to be disposed of in some other way.

The apartment B is preferably constructed altogether of wire. The novel features of this apartment are three. One of these features is the central feeding compartment. This compartment is composed of wires $D^2$, preferably vertical in position, as shown more particularly in Fig. 2, and close enough together to prevent any rat having entered apartment B from passing into the compartment D. The top of this compartment D is provided with a lid $D^3$, which when food is to be introduced into compartment D is temporarily removed, and the rat food or bait then being placed in compartment D, on the floor thereof, the lid $D^3$ is replaced and prevents any vermin from entering the compartment through its top.

A second feature of my invention consists in the formation of the sides of the trap, as follows: From a point considerably higher than the height of the rat or of the animal to be caught in the trap, the sides of the trap incline inwardly, as shown. These inwardly-inclining sides are indicated by the letter E. They constitute an obvious attraction to rats and the like vermin, for the reason that they present a specious appearance of ease in entering the apartment and of attaining the food or bait in the compartment D. The sides of this apartment B are suitably supported, preferably by uprights $E^2$, few and far between, and these uprights do not present the appearance of a closed hedged-in entrance to the compartment, as they pass in under the overhanging wall or side E of the trap. The upper walls $E^3$, if any, of the apartment B are preferably vertical and are preferably made of wire, as is also the top of this apartment.

Another feature of my invention is the construction of the lifting prongs or fingers F. Heretofore, so far as I am aware, the entrances to rat-traps were made of wire, composed of a series of lifting prongs or fingers all attached together rigidly, so that if one of the fingers or prongs were lifted, all would be lifted. One great objection to such an arrangement is that when a rat or similar animal, upon entering, lifted the door, he gave abundant opportunity for any rat or rats already within the trap to escape under the door while he was entering and also gave the animal entering considerable opportunity, before he had fully entered, or had bethought himself, to retrace his steps, whirl himself around, and work himself out. I obviate this disadvantage by so constructing the prongs that each prong shall lift independently of its adjacent prong. The advantage of this mode of construction is obvious, because, for among other reasons, a rat, when entering, lifts one or two of the prongs, (just the number required for him to enter,) thereby giving no opportunity for the rats in the trap to pass out on either side of him. Furthermore, as the rat is entering and attempts to back out, the sharp edges of the prongs cut him on the back and allow him no opportunity to whirl himself around, so as to extricate himself from the embarrassing position in which he has just been placed, and consequently he is obliged to advance into the apartment B. The preferred construction of these prongs or fingers is as follows: Each prong has a hinged connection at its free end. This preferably consists of an eye $F^2$, the eye surrounding a bar $F^3$, extending along the trap, and on each side of the prong is a guard $F^4$, provided at its upper end with a stop $F^5$ and at its lower end with a stop $F^6$. Thus the bar or prong F is allowed to be lifted up and down in an oscillatory manner between the stops $F^5$ and $F^6$, and is prevented from lateral deflection by means of the guards $F^4$, one on each side of the prong. The guard $F^4$ is preferably supported by a support, usually a broad flat sheet of metal $F^7$, and for the purposes of simplicity and economy of construction, a single sheet of metal is bent to form the piece $F^6$ and then bent up to form the guards $F^4$, and provided with a slot in the lower part in which the prongs can operate. Where the apartment C is present, a similar set of prongs is provided to form the door G between the apartment B and the apartment C.

The rat or other animal attracted by the bait which he sees located within the trap pokes his nose under one or two of the prongs and moving forward with comparatively little or no effort lifts the same and enters the apartment.

It will be understood for the more effective operation of the device that the pointed ends of the prongs are elevated above the floor so that there will be between the floor and the points of the prongs some space. This is of advantage, as it suggests to the animal that by crowding he can enter between the floor and the ends of the points, and he is therefore tempted to enter at such a place, which is the proper one for him to attempt to enter in order to catch him.

My invention is economical of manufacture, simple of construction, and remarkably advantageous in use, being especially useful in the apparatus for which it was constructed, namely, that of a trap for catching animals.

It is obvious that a device constructed according to my invention is applicable to traps for catching other animals besides rats or mice.

What I claim as new and of my invention, and desire to secure by Letters Patent, is—

1. In a trap, the vertical walls above, and the prongs F, pivoted at their upper outer ends at or in the vicinity of the lower edge of the vertical wall, and inclining downwardly and inwardly, and the cross-stops $F^6$, crossing beneath the prongs F, and secured to the frame, and the guards $F^4$, connected to the frame, and located between the prongs, and extending upward, substantially as and for the purposes specified.

2. In a trap, a series of prongs having an eye $F^2$, mounted on a supporting hinged bar and a flat support $F^7$ upon which the prongs when at rest lie and side guards $F^4$ projecting at nearly a right angle and provided with an upper stop $F^5$, substantially as and for the purposes specified.

3. In a trap, a series of hinged prongs, capable of independent movement and their supporting and guarding device consisting of the plate bent into one portion $F^7$ and into the portion $F^4$, slotted, the prongs lying in the said slots and moving therein, substantially as and for the purposes specified.

4. In a trap, a circular apartment B provided with prongs lifting independently of one another arranged so as to form an inwardly downwardly inclining wall, substantially as and for the purposes specified.

5. In a trap, a circular apartment B provided with prongs lifting independently of one another arranged so as to form an inwardly downwardly inclining wall, and receiving-apartment C combined therewith and connected by a door G, substantially as and for the purposes specified.

6. In a trap, the combination of a central bait-compartment composed of meshwork or barwork and a series of prongs operating independently of one another, located in the outer wall of the apartment B in which the said bait-compartment D is located and surrounding the said bait-compartment, substantially as and for the purposes specified.

RICHARD C. FLOWERS.

Attest:
A. S. LUDLOW,
E. S. EDSON.